Patented Mar. 8, 1938

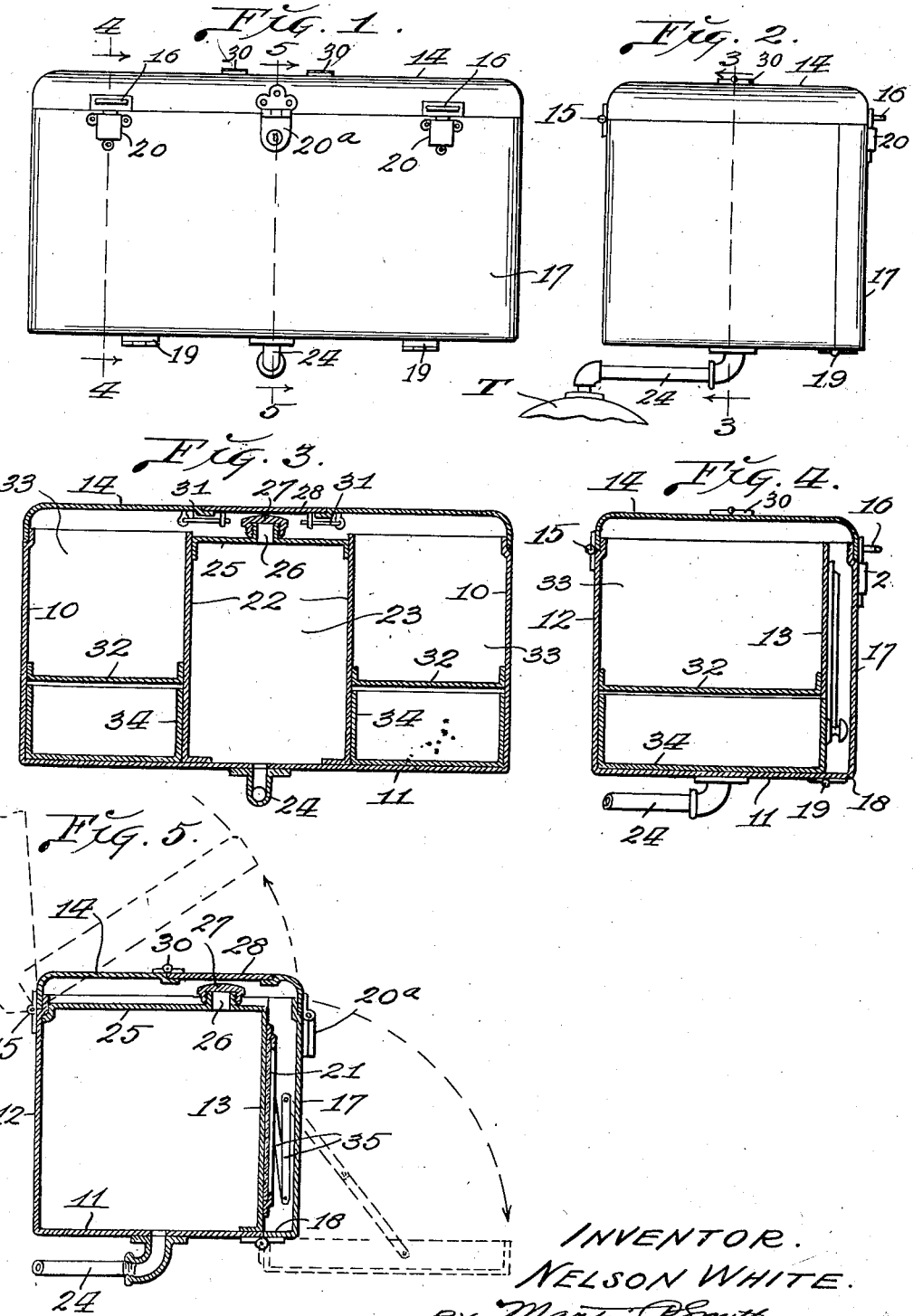

2,110,411

UNITED STATES PATENT OFFICE 2,110,411

COMBINED AUTOMOBILE TRUNK AND GAS TANK

Nelson White, Los Angeles, Calif.

Application February 11, 1936, Serial No. 63,379

1 Claim. (Cl. 224—29)

My invention relates generally to automotive equipment and more particularly to a trunk-like structure that is positioned on the rear portion of a motor vehicle and which contains a tank for holding a reserve supply of gasoline, there being chambers formed in the end portions of the trunk structure which serve as storage spaces for tools, extra equipment, luggage and like articles used by the motorist.

A further object of my invention is, to provide a combination trunk and reserve fuel tank that may be built into the body of the car by the manufacturer so as to conform to the shape and contour of the body or the trunk may be produced as a separate unit and mounted upon suitable supporting means at the rear of the car body and the reserve storage tank being connected to the tank that forms a part of the car equipment.

A further object of my invention is, to provide a combination trunk and reserve fuel tank having a rear panel that may be swung outwardly and downwardly into a horizontal position so as to function as a table from which food may be served or as a support for tools and equipment while making minor repairs or adjustments and further, to provide a construction wherein the rear cover or panel may be locked in closed position by the hinged cover that closes the top of the trunk structure.

With the foregoing and other objects in view my invention consists in certain novel features of construction and arrangements of parts that will be hereinafter more fully described and claimed and illustrated in the accompanying drawing in which:

Fig. 1 is a front elevational view of my improved trunk and reserve fuel tank.

Fig. 2 is an end elevational view.

Fig. 3 is a vertical longitudinal section taken on the line 3—3 of Fig. 2.

Fig. 4 is a cross section taken on the line 4—4 of Fig. 1.

Fig. 5 is a cross section taken on the line 5—5 of Fig. 1.

Referring by numerals to the accompanying drawing which illustrates a preferred embodiment of my invention, 10, 10 designate the end walls of a substantially rectangular container, 11 the bottom wall, 12 the rear wall and 13 the front wall. These walls are preferably constructed of sheet metal and adapted to close the top of this structure is a lid or cover 14, preferably formed of sheet metal, the rear edge of which is connected to the upper edge of the rear wall 12 by a hinge or hinges 15.

Secured to the front of the cover 14, adjacent the ends thereof, are handles 16 that are manually engaged when the lid or cover is swung upwardly and rearwardly into open position.

A front panel 17 occupies a position a slight distance in front of and parallel with the front wall 13 of the container and projecting rearwardly from the bottom and ends of this panel are short horizontally disposed flanges such as 18 which when the panel is closed, bear directly against the front face of the front wall 13.

A hinge or hinges 19 connect the bottom one of the flanges 18 with the lower front edge of the body of the container.

Secured on the outer face of the upper portion of panel 17, are sockets 20 that receive depending portions of the handles 16 so as to hold the cover 14 and panel 17 firmly in position when the same are closed.

Mounted on the front edge of lid or cover 14, is a hinged lock 20ª by means of which the lid or cover and hinged panel 17 may be locked to each other when closed.

Mounted on the central portion of the outer face of front wall 13, is a mirror 21, which may be utilized for dressing purposes by a person seated to the rear of the structure when the panel 17 is lowered and likewise when the said person is observing cars or persons that may approach the equipped vehicle from the rear.

Secured within the intermediate portion of the trunk structure, are vertically disposed partitions 22 that occupy positions parallel with the end walls 10 and the chamber 23 between these partitions serves as a storage space for gasoline.

Leading from the bottom of this storage space to the gasoline tank T of the vehicle to which the trunk is applied, is a conduit 24, preferably a metal tube so that the reserve or extra supply of gasoline may pass freely by gravity into tank T.

The top of the compartment 23 is closed by a fixed cover plate 25 the same being provided with a filling nipple 26 and the latter being normally closed by a readily removable cap 27.

A small portion 28 of the lid or cover 14 above the filling nipple and cap is separately formed and connected to the lid or cover by a hinge 30. This hinged member 28 when open gives ready access to the filling nipple 26 and cap 27 and when said member 28 is closed and before the lid or cover 14 is closed, said member 28 is secured on the inside by suitable fastening devices or hooks 31 that are pivotally mounted on the lid or cover and which engage eyes or keepers that depend from member 28.

Positioned between the end walls 10 and partitions 22, and lying parallel with the bottom 11, are horizontally disposed partitions 32 and the chambers 33 above these partitions provide storage space for clothing, food or other articles used by the motorists.

Those portions of the front wall 13 below the partitions 32 and between the end walls 10 and partitions 22 are cut away for the accommodation of drawers 34, which latter accommodate tools, dishes, toilet articles, automobile accessories or the like.

Folding braces 35 or flexible members such as chains are arranged between the ends of panel 17 and the ends of front wall 13 and which braces or members limit the downward swinging movement of panel 17 to maintain the same in a horizontal position when open (see dotted lines Fig. 5).

When the panel 17 and lid 14 are closed and fastened by means of the lock 20, it is impossible for unauthorized persons to obtain access to the interior of the combined trunk and tank and prior to the closing of the lid 14 hooks or latches 31 may be manipulated so as to secure the hinged member 28 in closed position, thus preventing unauthorized access to the gasoline storage tank.

When lid or cover 14 is unlocked and swung upwardly and rearwardly and panel 17 is swung downward as shown by dotted lines in Fig. 5, access may be had to the storage spaces 33 and the drawers 34 may be withdrawn.

When the lid or cover is open, the cap 27 may be removed from the nipple 26 to permit gasoline to be delivered into the storage space or if desired the hooks or latches 31 may be disengaged before closing and locking the lid 14, thus enabling the cap 27 to be removed from the gasoline storage chamber.

When the panel 17 is swung downward into a horizontal position, it serves as a table for serving food or for a dressing table.

Thus it will be seen that I have provided a combined automobile trunk and gas tank that is relatively simple in construction, inexpensive of manufacture and very effective in performing the functions for which it is intended.

It will be understood that minor changes in the size, form, and construction of the various parts of my improved combined automobile trunk and gas tank may be made and substituted for those herein shown and described without departing from the spirit of the invention, the scope of which is set forth in the appended claim.

I claim as my invention:

In an automobile trunk including a hinged cover therefor and an auxiliary gasoline tank integrally carried within said trunk; a filling opening in the top of said tank, a removable cap for said opening, said cover being formed to provide an opening therein directly above said filling opening of said tank, a movable panel normally closing said opening in said cover, and means on the inside of said cover and panel for securing the latter in a closed position, said means being inaccessible from the outside of said cover.

NELSON WHITE.